3,173,247
OPERATION AND COOLING OF FLIGHT
VEHICLES WITH HYDROCARBONS
John O. Smith, Swampscott, Charles N. Satterfield, South
Lincoln, and Bela M. Fabuss, Brookline, Mass., assignors to Monsanto Research Corporation, St. Louis, Mo., a corporation of Delaware
No Drawing. Filed Nov. 30, 1962, Ser. No. 241,160
9 Claims. (Cl. 60—35.4)

This invention relates to flight vehicles employing reaction type power plants and more particularly relates to methods of cooling the aircraft while in flight and to methods of developing thrust for driving the vehicle.

In a reaction type power plant, fuel and air oxidizing agent, e.g., oxygen or an oxygen-containing gas react in a pressure-restraining combustion chamber to form a mass of high temperature gases. These are exhausted from the chamber at high velocity to produce thrust. In a jet propulsion engine, such as a rocket, ram-jet, turbo-jet or pulse-jet engine, exhaustion in a rearward direction produces jet propulsion. In a turbine type engine, such as a gas-turbine or a turbo-prop engine, exhaustion is into a turbine which drives a propeller or other mechanical means for developing a forward thrust. Reaction type power plants may be used in widely different types of vehicles, but the present invention is particularly directed to those applications wherein heat of engine operation and/or aerodynamically produced heat accumulate during operation.

Aircraft have always had problems with heat dissipation, particularly from the engine. At subsonic speeds, sufficient cooling can be achieved by conduction to the surrounding air. The rate of cooling by this method, however, becomes insufficient at higher speeds, and air-cooling becomes impossible at multi-Mach speeds owing to the increasing aerodynamic drag of the convectors and the rise in stagnation temperatures. At these very high flight speeds, heat must be transferred to some part of the flight vehicle or to its load. Although the fuel which is stored on the vehicle could serve to receive this heat, in practice such procedure is unfeasible because the presently available jet fuels are not stable to the high temperatures which are developed at multi-Mach speeds; instead, they decompose to produce intolerable amounts of insoluble gum or other deposits, e.g. coke. Moreover such fuels have inadequate heat-sink capacities at the high speeds. Thus, whereas JP-4 fuel has a heat-sink capacity of 170 B.t.u./lb., the heat developed at 2.5-3.5 Mach requires a heat-sink capacity of from 220 to 550 B.t.u./lb. Likewise, although JP-6 fuel has a heat sink capacity of 230 B.t.u./lb., operation at 4.0 Mach requires a heat sink capacity of about 700.

To keep the load at a minimum, the material employed as heat sink should serve a plural function, i.e., it should serve not only to absorb heat, but to perform some other necessary task. As pointed out above, the prior jet fuels could not be used as heat sinks and as fuel because they decomposed, upon absorption of the heat, to give insoluble gums and cokes. A material which could be used as heat sink without making it useless as fuel would be necessary to solve the problem.

An object of this invention is to provide a means of dissipating heat generated by combustion of fuel in the operation of aircraft or flight vehicles, e.g., rockets, employing reaction type power plants. Another object is the provision of a means of dissipating aerodynamically produced heat. Still another object is the dissipation of combustion heat and aerodynamic heat without substantial addition to load. A further object of the invention is the provision of a heat sink which will effectively dissipate heat generated in super-Mach flight while serving as a means of supplying fuel. Still another object is the provision of a method whereby an easily stored and transported liquid hydrocarbon is pyrolyzed during flight of aircraft or other flight vehicles by heat generated in said flight, with consumption of said heat and formation, as pyrolysis product, of a non-fouling fuel of higher energy than that of said liquid hydrocarbon.

These and other objects hereinafter disclosed are provided by the invention wherein flight vehicles powered by a reaction type power plant are cooled and operated by passing hydrocarbon material boiling at from 150° F. to 800° F. and within a 120° F. range, being substantially free of aliphatic unsaturation, and having an aromatic hydrocarbon content of from 0.0% to 10% by weight, through a confined zone at a temperature of from 800° F. to 1500° F. and a pressure of from 200 to 1000 p.s.i.g. to obtain endothermic pyrolysis of the hydrocarbon material and cooling of the aircraft, and feeding the resulting pyrolysate as fuel directly into the power plant of said aircraft.

More particularly the invention provides the method of operating jet-propelled flight vehicles wherein there is employed a hydrocarbon material boiling at from 150° F. to 800° F. and within a 120° F. range, being substantially free of aliphatic unsaturation and non-hydrocarbon matter, and having an aromatic content of 0.0% to 10.0%, which method comprises passing said hydrocarbon through a reactor system at a temperature of from 800° F. to 1500° F., a pressure of 200 to 1000 p.s.i.g., and a residence time of 1 to 60 seconds, to obtain pyrolysis of said hydrocarbon material and cooling of the component parts of the flight vehicle, and passing the resulting hot pyrolysate as fuel directly into the combustion chamber of the power plant of the flight vehicle.

Although it is known that pyrolysis, or cracking of hydrocarbon material involves consumption of heat, carbonization to a greater or lesser extent has been generally believed to limit the temperature and pressure conditions at which cracking could be conducted. At low temperatures there occurs a certain amount of cracking with little or no coking, but the extent of cracking is so little that there is no significant heat consumption and no great change in the burning qualities of the hydrocarbon. We have found, however, that certain hydrocarbon material can be cracked at very high temperatures, i.e., at temperatures of from, say, 800° F. to 1500° F. without substantial coking and with significant consumption of heat to give improved fuels for reaction type power plants.

The hydrocarbon material which we use must first of all be substantially pure hydrocarbon. There should be an almost complete absence of, e.g., nitrogen, oxygen and sulfur impurities, especially the latter. The hydrocarbon material should be substantially free of aliphatic, i.e., olefinic and acetylenic, unsaturation. The hydrocarbon material may or may not contain a limited amount of aromatic hydrocarbons, i.e., compounds having an aromatic ring present in their structure. We have found that so long as the aromatic hydrocarbon content does not exceed 10% by weight, pyrolysis under the presently employed conditions does not detract from the value of the pyrolysis products and makes no significant change in the quantity of heat absorbed. A higher aromatic content is not recommended, however, for thereby not only does the quality of the pyrolysis product deteriorate insofar as burning characteristic is concerned, but also coking becomes a problem.

As examples of suitable hydrocarbon materials are the substantially pure higher alkanes, e.g., octane, nonane, decane, undecane, dodecane, tridecane, tetradecane, pentadecane, hexadcane, octadecane, eicosane, tetracosane, etc. Mixtures of these, in any proportion, are suitable, so long as the mixture boils within a 120° F. range. The cycloalkanes which are presently useful include cyclohexane, decahydronaphthalene, bicyclohexyl, the bicycloheptanes -octanes and -nonanes, and such cycloalkanes substituted by one or more alkyl radicals, e.g., methyl-, ethyl-, propyl-, isopropyl-, butyl-, iso-butyl, tert-butyl, pentyl-, tert-pentyl-, hexyl-, heptyl-, 2-ethylhexyl, decyl, dodecyl, or octadecylcyclohexane, -decahydronaphthalene or -bicyclohexyl; 1,2-, 1,3-, or 1,4-dimethyl- or dibutyl-cyclohexane; 1-butyl-3-methylcyclohexane, 1,4-diethylbicyclohexyl, tetramethylcyclohexane, etc. Mixtures of two or more cycloalkane hydrocarbons or of the cycloalkanes and the alkanes are also useful.

The aromatic hydrocarbon which may be admixed with the alkaline and/or cycloalkane in a quantity of up to 10% by weight may be, e.g., benzene, naphthalene, tetrahydronaphthalene, biphenyl, terphenyl, fluorene, or acenaphthene or an alkyl derivative thereof, e.g., toluene, xylene, ethylbenzene, cumene, mesitylene, pentylbenzene, 2-ethylhexylbenzene, dodecylbenzene, α- or β-butylnaphthalene, 4,4'-diisopropylbiphenyl, etc.

Mixtures of hydrocarbons having a boiling range within 120° F., an initial boiling point of at least 350° F. and an end point below 550° F., and meeting the above specifications with respect to olefin and aromatic content are particularly useful and are readily available as commercially supplied fuels.

The hydrocarbon material which is to be pyrolyzed is stored conventionally, e.g., in the wings of a jet-propelled craft, and conversion of the material into a higher energy fuel and consequent dissipation of heat is effected by passing it through a zone maintained at 800° F. to 1500° F. and under a pressure of 200 to 1000 p.s.i.g. Generally, the input material will be preheated by heat generated in operation of the craft. The high temperature, high pressure zone will usually be a tubular reactor constructed of inert material such as stainless steel or steel alloy such as Inconel or Hastelloy and having an inside diameter of from, say 0.1 to 2.0 inches. Depending upon the heat and pressure conditions and upon reactor dimensions, the sojourn time in the reactor will vary. Based on the volume of the heat-exchanger, i.e., of the reactor, per volume of liquid input, the sojourn time will generally be from 1 to 60 seconds. Sojourn time is defined here as the time required for the liquid fuel at ambient conditions to pass the heated reactor section. Since high pressure in the input lines necessitate large pumps and thicker fuel lines, and hence more weight, it is desirable to operate at minimum pressures within the 200 to 1000 p.s.i.g. range. The fuel which issues from the reactor is generally a very hot mixture of liquid and gas which must be fed directly into the power plant, e.g. the jet-engine. This is because the heat absorbed by the fuel is released at the time of combustion in the engine, and this additional energy increases engine power output.

The invention is illustrated by, but not limited to, the following examples:

*Example 1*

This example shows pyrolysis of a hydrocarbon fraction known to the trade as Soltrol–170, boiling at from 418–468° F., and consisting essentially of a mixture of $C_{12}$–$C_{15}$ paraffins.

Said hydrocarbon fraction was heated to 800° F. and then continuously charged to an electrically heated, constant temperature, stainless steel tube reactor which had a length of 4 feet and an inside diameter of 0.125 inch, and continuously pyrolyzed at a temperature of 1200° F. and a pressure of 200 p.s.i.g. The hydrocarbon fraction was introduced into the reactor at the rate of one liter per hour with a consequent residence time within the reactor of 2.1 seconds. In order to ascertain the nature of the product, the hot vapors issuing from the reactor were analyzed. There was obtained a 64.9% by weight conversion of the Soltrol–170 to cracked products, 35.1% by weight of the input having been converted into gaseous products having the composition shown below, and 29.8% by weight having been converted into a liquid pyrolysate boiling substantially below that of the feed. Conversion to coke was only 0.036% by weight of the feed. By chromatographic analysis, the composition of the gaseous product was as follows:

| | Percent by weight |
|---|---|
| Hydrogen | 3.3 |
| Methane | 27.1 |
| Ethylene | 10.3 |
| Ethane | 7.1 |
| Propylene | 18.2 |
| Propane | 9.5 |
| Isobutene | 19.0 |
| Isobutane | 5.5 |

The composition of the liquid pyrolysate was found to be 54.3% by weight saturates, 32.1% by weight olefins, and 17.1% by weight aromatics.

Evaluation of the burning property of the liquid pyrolysate on the Erdco Luminometer gave a luminosity number of 65. That of the gaseous product was about 200.

At a conversion of 60% by weight, the heat of reaction, $\Delta H$, of the Soltrol–170 is 346 B.t.u./lb., the sensible heat from 70° F. to 1200° F. is 890 B.t.u./lb., and the heat sink capacity is 1098 B.t.u./lb.

In a similar run, but using a pressure of 500 p.s.i.g. and a residence time of 3.14 seconds (feed rate of 1326 ml./hr.) there was obtained a 55% conversion of the introduced Soltrol–170, with the liquid pyrolysate to gas ratio being substantially 1:1. Here again there was obtained only a 0.036% by weight conversion to coke.

*Example 2* n-Hexadecane was preheated to 800° F. and pyrolyzed in the reactor described in Example 1. Using the conditions shown below, the following results were obtained:

| Run No. | 1 | 2 | 3 | 4 | 5 |
|---|---|---|---|---|---|
| Pressure, p.s.i.g | 1,000 | 1,000 | 1,000 | 500 | 200 |
| Temperature, °F | 1,090 | 1,200 | 1,190 | 1,300 | 1,300 |
| Length of run, min | 35 | 30 | 35 | 30 | 30 |
| Feed rate, ml./hr | 1,214 | 1,994 | 1,246 | 1,220 | 2,860 |
| Contact time, sec | 32.6 | 18.5 | 29.6 | 14.6 | 12.9 |
| Conversion, wt. percent | 51.6 | 70.2 | 82.5 | 69.7 | 31.6 |
| Gas, wt. percent | 6.6 | 25.7 | 28.5 | 30.9 | 9.5 |
| Cracked liquid, wt. percent | 44.4 | 49.3 | 54.1 | 38.8 | 22.1 |
| Coke, wt. percent×10⁻⁵ | 208 | 169 | 171 | 190 | 16 |

The heat sink capacity of the hexadecane was considered to be equivalent to the total amount of heat absorbed by the hexadecane when heating it from its melting point (65° C.) to the final temperature and pressure, and by the endothermic heat effect of the cracking reaction. At 60% conversion, based on reaction enthalpy of 200 B.t.u./lb. of feed, the heat sink capacity at a pressure of 1000 p.s.i.g. and 1100° F. is 935 B.t.u./lb.; at 1000 p.s.i.g. and 1200° F. it is 1025 B.t.u./lb.; at 500 p.s.i.g. and 1300° F. it is 1128 B.t.u./lb. and at 200 p.s.i.g. and 1300° F. it is 1140 B.t.u./lb.

*Example 3*

Cyclohexane was pyrolyzed, employing the equipment described in Example 1, by preheating it to 800° F and then passing it through the reactor at a temperature of 1300° F., a pressure of 500 p.s.i.g., and a residence time of 1.486 seconds. There was thus obtained 65.5% by weight conversion of cyclohexane input, with a 29.4% conversion to gaseous ($C_4$ and lower) products, a 20.8% conversion to $C_5$–$C_7$ liquid, and a 9.4% conversion to liquid boiling above the $C_5$–$C_7$ range but substantially below the boiling point of cyclohexane. The conversion to coke was 0.124% by weight of the feed.

At 60% conversion, the heat of reaction, $\Delta H$, is 457 B.t.u./lb., the sensible heat from 70° F. to 1200° F. is 856 B.t.u./lb., and the heat sink capacity is 1130 B.t.u./lb.

*Example 4*

This example shows the use of a hydrocarbon fraction designated as CRC-2 fuel, which consists of 95% by weight of paraffinic hydrocarbons with the balance being aromatic hydrocarbons and which has a boiling range of from 406° F.–508° F. Employing the equipment described in Example 1, the pre-heated (800° F.) material was passed through the reactor at a temperature of 1200° F., a pressure of 500 p.s.i.g. and a residence time of 3.73 seconds. There was obtained 61.2% by weight conversion of the feed, with 36.2% conversion to gases and 25.0% conversion to liquid boiling up to 400° F. The conversion to coke was 0.0117% by weight of the feed.

The heat of reaction, calculated from heat of combustion determinations made on four experimental runs was 370 B.t.u./lb. at 1200° F. and 500 p.s.i.g. At 60% conversion and at 1200° F. and 500 p.s.i.g. the total heat sink capacity, including the sensible heat from 70° F. to 1200° F. was 1160 B.t.u./lb.

*Example 5*

A hydrocarbon fraction designated as CRC-1 fuel, consisting of paraffinic hydrocarbons and having a boiling range of 378° F. to 475° F. was preheated to 800° F. and passed through the reactor described in Example 1 at a temperature of 1300° F., a pressure of 500 p.s.i.g. and a residence time of 2.61 seconds. There was obtained an 81.50% by weight conversion of the feed, with 49.70% conversion to gases and 31.80% conversion to liquid boiling below 390° F. The conversion to coke was 0.027% by weight of the feed.

The heat of reaction, calculated for four experimental runs was 250±60 B.t.u./lb. at 1300° F. and 500 p.s.i.g. The total heat sink capacity for the pyrolysis of the CRC-1 fuel to 60% conversion, including the sensible heat from 70° F. to 1300° F., is 1130 B.t.u./lb.

*Example 6*

Decahydronaphthalene was preheated to a temperature of 800° F. and then continuously passed through the tubular reactor described in Example 1 at a temperature of 1300° F., a pressure of 500 p.s.i.g. and a residence time of 1.83 seconds. There was thus obtained 78.6% by weight conversion of the feed, with 27.0% conversion to gaseous product and 54.9% conversion to cracked liquid product. A 0.032% conversion to coke occurred.

From heat of combustion measurement, the calculated value for heat of reaction is 440 B.t.u./lb. At 60% conversion, the heat sink capacity of the decahydronaphthalene, including the sensible heat from 70° F. to 1300° F., is about 1200 B.t.u./lb.

As indicated earlier herein, the hydrocarbon material which is pyrolyzed should be substantially free of non-hydrocarbon material and of olefinic hydrocarbons. It may be a mixture of a number of paraffinic compounds. The paraffinic material may be substantially low-boiling, i.e., it may boil at around 150° F., or it may boil at around temperatures which approach the pyrolysis temperature, i.e., at up to 800° F., so long as the range between the initial boiling point and the end point is not excessive. A substantially pure higher alkane or cycloalkane such as hexadecane or decahydronaphthalene, both of which are commercially available, is thus admirably suited for the purpose. The paraffinic material should be substantially free of olefinic hydrocarbon material in order to avoid fouling gum-formation and minimize coking. The aromatic content of the hydrocarbon material which is subjected to pyrolysis should not be greater than 10% by weight, since carbonization increases with the aromaticity of the feed.

The nature of the pyrolysis products will be somewhat varied by the nature of the feed as well as by the conditions employed in the pyrolysis. The pyrolysate is a mixture of gaseous and liquid hydrocarbons, and for obtaining maximum jet fuel energy, it is advantageous to employ feed and operating conditions which favor formation of a high gas:liquid ratio while at the same time yielding the minimum of coke. Both the gaseous and liquid pyrolysates are generally mixtures of paraffins, olefins and aromatics.

The pyrolysates of the instant invention are eminently suitable for use in jet and rocket engines, particularly turbojet and turboprop aircraft engines. In operation of such engines the hot pyrolysate and an oxidizing agent, e.g., air, oxygen, hydrogen peroxide, nitric acid, nitrogen tetraoxide, etc., are charged into the combustion chamber in a proportion which gives rise to a combustible mixture. As is known to those skilled in the art, the particular fuel-oxidant ratio will be dependent not only upon the requirements of the moment, but also upon the nature of the engine.

We claim:

1. The method of cooling and operating a flight vehicle which is powered by a reaction type power plant which comprises passing hydrocarbon material boiling at from 150° F. to 800° F., being substantially free of aliphatic unsaturation and non-hydrocarbon matter and having an aromatic hydrocarbon content of from 0.0% to 10.0% by weight, through a confined zone at a temperature of from 800° F. to 1500° F. and a pressure of from 200 to 1000 p.s.i.g. to obtain endothermic pyrolysis of the hydrocarbon material and cooling of the vehicle, feeding the resulting pyrolysate as fuel directly into the power plant of said flight vehicle, and oxidizing the pyrolysate in the power plant.

2. The method of cooling and operating jet-propelled flight vehicles which comprises passing a hydrocarbon material boiling at from 150° F. to 800° F., being substantially free of aliphatic unsaturation and non-hydrocarbon matter and having an aromatic hydrocarbon content of from 0.0% to 10.0% by weight, through a tubular reactor at a temperature of from 800° F. to 1500° F., a pressure of 200 to 1000 p.s.i.g. and a residence time of 1 to 60 seconds, to obtain pyrolysis of said hydrocarbon material and cooling of the flight vehicle, passing the resulting hot pyrolysate as fuel directly to the combustion chamber of the jet propulsion engine of said vehicle, and burning the pyrolysate in the combustion chamber.

3. The method of cooling and operating jet-propelled flight vehicles wherein there is employed a hydrocarbon material boiling at from 150° F. to 800° F. and within a 120° F. range, being substantially free of aliphatic unsaturation and non-hydrocarbon matter and having an aromatic content of 0.0% to 10.0%, which method comprises passing the hydrocarbon through a reaction zone maintained at a temperature of from 800° F. to 1500° F. and a pressure of 200 to 1000 p.s.i.g. for a residence time of 1 to 60 seconds, to obtain pyrolysis of said hydrocarbon material and cooling of the vehicle, passing the resulting hot pyrolysate as fuel to the combustion chamber of the jet propulsion engine of the flight vehicle, and burning the pyrolysate in the combustion chamber.

4. The method defined in claim 3, further limited in that the hydrocarbon material has a boiling point of 418–468° F. and consists essentially of a mixture of $C_{12}$–$C_{15}$ paraffins.

5. The method defined in claim 3, further limited in that the hydrocarbon material is n-hexadecane.

6. The method defined in claim 3, further limited in that the hydrocarbon material is cyclohexane.

7. The method defined in claim 3, further limited in that the hydrocarbon material is decahydronaphthalene.

8. The method defined in claim 3, further limited in that the hydrocarbon material has a boiling range of 406° F. to 508° F. and consists of 95% by weight of paraffinic hydrocarbons, with the balance being aromatic hydrocarbons.

9. The method defined in claim 3, further limited in that the hydrocarbon material consists of paraffinic hydrocarbons and has a boiling range of 378° F. to 475° F.

References Cited by the Examiner
UNITED STATES PATENTS
2,959,915    1/60    Dille et al. _____ 60—35.4

CARL D. QUARFORTH, *Primary Examiner.*

UNITED STATES PATENT OFFICE
CERTIFICATE OF CORRECTION

Patent No. 3,173,247              March 16, 1965

John O. Smith et al.

It is hereby certified that error appears in the above numbered patent requiring correction and that the said Letters Patent should read as corrected below.

Column 2, line 71, for "hexadcane" read -- hexadecane --; column 3, line 16, for "alkaline" read -- alkane --.

Signed and sealed this 14th day of September 1965.

(SEAL)
Attest:

ERNEST W. SWIDER             EDWARD J. BRENNER
Attesting Officer              Commissioner of Patents